United States Patent
Marchand et al.

(10) Patent No.: US 6,649,297 B1
(45) Date of Patent: Nov. 18, 2003

(54) BIPOLAR PLATES FOR FUEL CELL AND FUEL CELL COMPRISING SAME

(75) Inventors: Marielle Marchand, Bures sur Yvette (FR); Olivier Lebaigue, Apprieu (FR); Michel Amblard, St Martin le Vinoux (FR); Bruno Bador, Biviers (FR); Fabien Heurtaux, Versailles (FR); Jean-Pierre Lisse, Montigny le Bretonneux (FR)

(73) Assignees: Commissariat a l'Energie Atomique, Paris (FR); Automobiles Peugeot, Paris (FR); Automobiles Citrogen, Neuilly s/Seine (FR); Renault SA, Boulogne-Billancourt (FR)

( * ) Notice: Subject to any disclaimer, the term of this patent is extended or adjusted under 35 U.S.C. 154(b) by 0 days.

(21) Appl. No.: 09/831,133
(22) PCT Filed: Nov. 10, 1999
(86) PCT No.: PCT/FR99/02765
§ 371 (c)(1), (2), (4) Date: Jun. 28, 2001
(87) PCT Pub. No.: WO00/30199
PCT Pub. Date: May 25, 2000

(30) Foreign Application Priority Data

Nov. 12, 1998 (FR) .............................................. 98 14199

(51) Int. Cl.⁷ ................................................. H01M 2/00
(52) U.S. Cl. ............................ 429/34; 429/38; 429/39; 29/623.1; 29/825; 29/729; 29/730
(58) Field of Search ............................. 429/32, 34, 38, 429/39; 29/623.1, 825, 729, 730, 745, 746

(56) References Cited

U.S. PATENT DOCUMENTS

| 3,134,696 | A | | 5/1964 | Douglas et al. | |
|---|---|---|---|---|---|
| 4,175,165 | A | | 11/1979 | Adlhart | |
| 4,292,379 | A | * | 9/1981 | Kothmann | 429/34 |
| 4,788,110 | A | * | 11/1988 | Bernard | 429/39 |
| 5,616,431 | A | * | 4/1997 | Kusunoki et al. | 429/39 |
| 5,789,094 | A | * | 8/1998 | Kusunoki et al. | 429/39 |
| 6,127,055 | A | * | 10/2000 | Simmons, Jr. | 429/34 |
| 6,372,376 | B1 | * | 4/2002 | Fronk et al. | 429/38 |
| 6,376,110 | B1 | * | 4/2002 | Koschany | 429/32 |
| 6,511,766 | B1 | * | 1/2003 | Loutfy et al. | 429/38 |
| 6,517,963 | B2 | * | 2/2003 | Lakshmanan et al. | 429/39 |
| 6,544,681 | B2 | * | 4/2003 | McLean et al. | 429/39 |

FOREIGN PATENT DOCUMENTS

JP WO 98 52242 11/1998

OTHER PUBLICATIONS

Patent Abstract of Japan Pub. #: 08 045520 A, vol. 096, No. 006, Feb. 16, 1996.
P.D. Naylor, et. al, vol. 13, Jan. 1, 1991, pp. 253–261.
Patent Abstract of Japan Pub. #: 03 289057 A, vol. 016, No. 120, Dec. 19, 1991.
Patent Abstract of Japan Pub. #: 06 236765 A, vol. 018, No. 617, Aug. 23, 1994.
Patent Abstract of Japan Pub. #: 08 096820 A, vol. 096, No. 008, Apr. 12, 1996.

(List continued on next page.)

Primary Examiner—Bruce F. Bell
(74) Attorney, Agent, or Firm—Pearne & Gordon LLP (57) ABSTRACT

The invention relates to a bipolar plate for a fuel cell comprising on at least one of its faces at least one flute able to form with the surface of an adjacent electrode at least one gas distribution channel, wherein said distribution channel has a shape or geometry such that the liquid of the biphasic flow flowing in said channel may be moved away from said electrode surface.

The invention also relates to a method for preparing such a bipolar plate and to a fuel cell comprising at least one of such bipolar plates.

29 Claims, 5 Drawing Sheets

OTHER PUBLICATIONS

Patent Abstract of Japan Pub. #: 08 138692 A, vol. 096, No. 009, May 31, 1996.

Patent Abstract of Japan Pub. #: 06 089730 A, vol. 018, No. 345, Mar. 29, 1994.

Patent Abstract of Japan Pub. #: 07 220746 A, vol. 095, No. 011, Aug. 18, 1995.

Patent Abstract of Japan Pub. #: 06 267564 A, vol. 018, No. 672, Sep. 22, 1994.

Patent Abstract of Japan Pub. #: 09 180741 A, vol. 097, No. 011, Jul. 11, 1997.

Patent Abstract of Japan Pub. #: 05 251097 A, vol. 018, No. 003, Sep. 28, 1993.

R. H. Blackmer et. al. "Ion Exchange Membrane", vol. 70, No. 1, Jan. 1, 1962, pp. 82–86.

* cited by examiner

BIPOLAR PLATES FOR FUEL CELL AND FUEL CELL COMPRISING SAME

DESCRIPTION

The present invention relates to a bipolar plate for a fuel cell.

The invention also concerns a fuel cell device, in particular of the solid electrolyte type, comprising at least one of said bipolar plates.

BACKGROUND OF THE INVENTION

The field of the invention may be defined as that of fuel cells, in particular fuel cells of the solid polymer electrolyte type.

Solid polymer electrolyte type fuel cells in particular, find their application in electrical vehicles which are presently the subject of many development programs in order to bring a solution to pollution caused by thermal engine vehicles.

With solid polymer electrolyte fuel cells playing the role of an electrochemical energy converter associated with an onboard energy tank, for example hydrogen or an alcohol, problems may be overcome, notably problems with motor vehicles, charging times and costs, related to the use of batteries in electrical vehicles.

Figure 1:
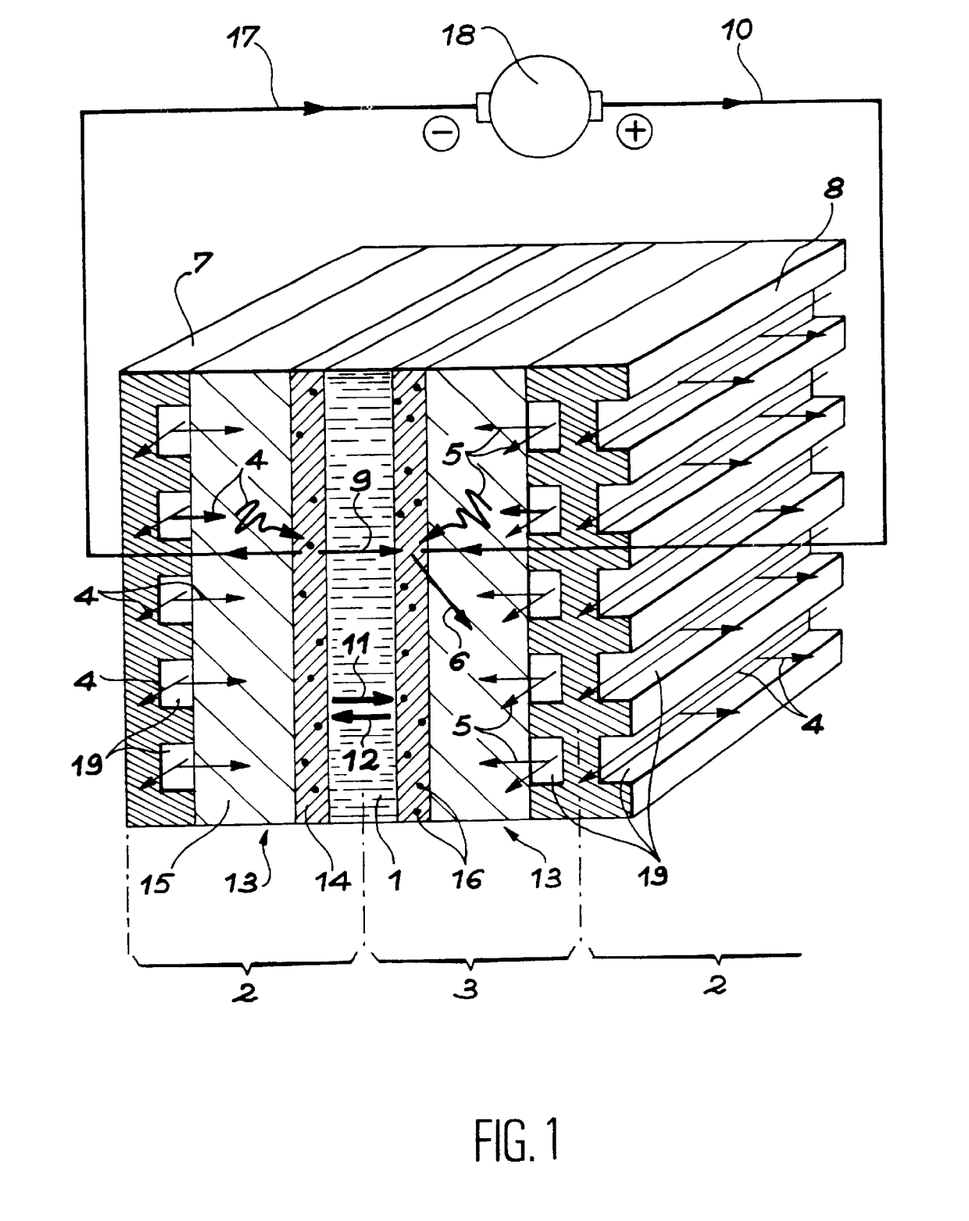
FIG. 1 schematically illustrates a fuel cell comprising several elementary cells with an electrode/membrane/electrode assembly, as well as bipolar plates.

The schematic assembly of a fuel cell for producing electrical energy is partly illustrated in enclosed FIG. 1.

A membrane of the ion exchanger type formed of a polymer solid electrolyte (1), is used for separating the anodic compartment (2) where oxidation of the fuel such as hydrogen $H_2$ (4), occurs according to the equation:

from the cathodic compartment (3), where the oxidizer, such as atmospheric oxygen $O_2$ (5), is reduced according to the equation:

with production of water (6), while the anode and cathode are connected through an external circuit (10). The thereby produced water flows between both compartments by electro-osmosis and by diffusion (arrows 11, 12).

The ionic conducting membrane is generally an organic membrane of the perfluorated ionomer type containing ionic groups which, in the presence of water, provide conduction of protons (9) produced at the anode by oxidation of hydrogen.

The thickness of this membrane is from a few tens to a few hundred of microns and it results from a compromise between mechanical resistance and ohmic drop. This membrane also enables separation of gases. The chemical and electrochemical resistance of the membranes generally provide battery operation over periods greater than 1,000 hours.

The bulk electrodes (13) placed on both sides of the membrane, generally comprise an active area (14) and a diffusion area (15). The active area comprises porous graphite covered with noble metal grains (16), such as platinum, and a thin coating of an ionic conducting polymer, with a similar structure to that of the membrane, provides ionic transport. The diffusion area (15) comprises a porous material hydrophobized by applying a hydrophobic polymer, such as graphite coated with PTFE. The hydrophobicity allows the liquid water to be discharged.

Protons produced at the anode, through oxidation e.g. of hydrogen at the surface of the platinum grains, are transported (9) through the membrane to the cathode where they recombine with ions produced by the reduction e.g. of atmospheric oxygen giving water (6).

The thereby generated electrons (17), may then power for example, an electric motor (18) placed in the external circuit (10), with water as sole byproduct of the reaction.

The set of membrane plus electrodes is a very thin assembly with a thickness of the order of a millimeter and each electrode is supplied with gases from behind, for example by means of a fluted plate.

The power densities obtained through this recombination and which are generally of the order of 0.5–2 $W/cm^2$, if hydrogen and oxygen are used, require the combination of several of these bulk electrode/membrane/bulk electrode structures in order to obtain, for example the 50 kW necessary for a standard electrical vehicle.

In other words, a large number of these structures must be assembled, the elementary surfaces of which may be of the order of 20×20 $cm^2$, in order to obtain the desired power, notably if the fuel cell is used in an electrical vehicle.

For this purpose, each set formed of two electrodes and a membrane, defining an elementary cell of the fuel cell, is thus positioned between two impermeable plates (7, 8), which, on the one hand, provide hydrogen distribution on the anode side and on the other hand oxygen distribution on the cathode side. These plates are called bipolar plates.

Bipolar plates used in fuel, cells must fulfil several functions; they should i.a. meet the following criteria or requirements:

provide mechanical resistance of the bulk electrodes/membranes sets in the assemblies of the filter/press type, while limiting the thickness to a few millimeters in order to obtain an overall volume of compatible cell, notably for application in an electrical vehicle;

provide electronic and thermal conduction between the successive bulk electrodes/membranes sets, by obtaining the largest possible electronic and thermal conductivities in order to limit ohmic drops detrimental to the cell's operation (excessive heating) and efficiency;

provide gas tightness while withstanding thermal and electrochemical corrosion associated with the specific operating conditions for a cell;

integrate diffusion paths providing homogeneous distribution of supply gases on the electrodes;

integrate components for removing excess water;

integrate cooling components.

Gas distribution channels with a square or rectangular section (19), for example with a side of about 1 to 2 millimeters, are machined on the bipolar plates for gas distribution. These channels are for supplying electrodes with gas in the most uniform manner as possible as they are laid out so as to meander over the whole surface of the electrode. They also enable the produced water to be recovered and discharged outside. These channels usually consist of horizontal sections separated by 180° downward bends.

In order to minimize pressure losses between the gas inlet and outlet and to avoid imposing a too strong pressure difference between both faces of the membrane, several channels may be positioned on a same bipolar plate or distributor plate, for example in parallel.

It has been noted that the performances of cells provided with such bipolar plates, including gas distribution channels with a square or rectangular section, were still unsatisfactory, in particular because the attained relatively low maximum voltage, which is about 0.5 V to 0.7 V cm$^2$ while operating in $H_2$/air, may be considered as insufficient.

Further, the delivered voltage exhibits strong instability over time, and it is impossible to maintain the highest voltage level over a long period without their occurring occasionally large and totally unexpected variations.

These problems apparently seem to be related to the flow of various gas and liquid fluids flowing in the fuel cell device, and, in particular, in the gas distribution channels of the bipolar plates.

On the other hand, the presently used bipolar plates are either in graphite impregnated with resins, or in stainless steel. In both cases, it is necessary to resort to lengthy, costly and complicated machining for forming gas supply grooves, channels or flutes for the bipolar plates.

It was thus demonstrated that the cost of these plates may account for about 60 to 70% of the total cost for existing prototypes, a large, if not essential portion of the cost of the plates being associated with their machining.

Thus, if during recent years consequent progress has been made and has provided a reduction in fuel cell costs, by reducing the amounts of platinum used on the one hand and on the other hand to a lesser extent, the manufacturing costs for the required membranes, substantial progress still remains to be made as regards the plates, providing simplified implementation, notably by suppressing machining operations, in particular for obtaining gas diffusion paths.

Such a simplification in their manufacturing leading to a reduction in the plates' costs would have repercussions on the cost of fuel cells bringing them into a price range similar to that of a thermal engine.

Accordingly, there is a need for bipolar plates for fuel cells, in particular for solid electrolyte fuel cells with which, when they are used in such a fuel cell, enhanced performances may be achieved, notably as regards the attained maximum voltage, and which ensure that these high performances are maintained over time, without their occurring unexpected and random variations of the latter, for such bipolar plates which on the other hand have to meet i.a. all the already aforementioned requirements.

In addition, there is also a need for bipolar plates, which may be simply prepared, in a limited number of steps and at a lower cost and by means of a method which in particular limits the lengthy and costly machining operations which cancel out the cost of these parts and consequently of the fuel cells which comprise them.

SUMMARY OF THE INVENTION

Accordingly, the object of the invention is to provide bipolar plates for fuel cells which meet i.a. all the aforementioned needs, which do not have the drawbacks, disadvantages, defects and limitations of the bipolar plates of the prior art, and which solve the problems of the bipolar plates of the prior art.

The object of the invention is further to provide a method for manufacturing such bipolar plates for fuel cells which is i.a. simple and of a low cost and reduced duration.

Finally, the object of the invention is to provide a fuel cell device exhibiting enhanced performances—notably in terms of attained maximum voltage and of stability of such performances over time—with notably lowered costs, whereby such a fuel cell device may, in particular, be used in an electrical vehicle.

This and still other objects are achieved according to the invention, by a bipolar plate for a fuel cell comprising on at least one of its faces, at least one flute able to form with the surface of an adjacent electrode, at least one gas distribution channel, wherein said distribution channel has a shape or geometry so that the liquid of the biphasic flow flowing in said channel may be moved away from said electrode surface.

Generally, said adjacent electrode surface is a substantially vertical surface.

Preferably, it is the transverse section of said channel which has a shape or geometry such that the liquid of the biphasic flow flowing in said channel may be moved away from the electrode surface.

The shape or specific geometry of the channels and, in particular, of the transverse section of the gas distribution channels according to the invention, moves the liquid away from the electrodes, or even preferentially enables the liquid to be moved towards areas away from the surface of the electrode, for example towards an area which may be defined as "the bottom" of said flute or said channel and formation of a liquid film such as a water film against the surface of the electrode is thus prevented.

Thanks to the specific shape or geometry of the gas distribution channels according to the invention, a particular state of flow is obtained which is favorable to the cell's performances. Among the many geometries possible for the flow channels, this specific geometry according to the invention is the only one which enables a particular type of flow to be obtained, in turn, among all the possible states of flow, wherein the flowing liquid is moved away from the electrode.

Surprisingly, this type of flow is the one with which, in particular, the best performances of the fuel cell may be achieved in a stable way, notably the highest voltage for the longest period, without any random and unexpected variations over time.

With the bipolar plate, according to the invention, all the aforementioned needs may be met and a remedy may be found for problems posed by the bipolar plates of the prior art, including gas distribution channels which have a square or rectangular section.

The bipolar plate, according to the invention, meets all the above mentioned requirements, which bipolar plates for fuel cells should meet.

With the bipolar plate, according to the invention, a higher maximum voltage may be obtained than in prior art fuel cells provided with square or rectangular section distribution channels.

This high voltage level is maintained for a long period without any notable variation in voltage over time, i.e. voltage delivered by the cell is permanently very high and has a large time stability without any random variation. The cell's reliability is enhanced.

The bipolar plate according to the invention also provides the advantage of widening the range of operating parameters, such as the cell's acceptable flow rates, as compared with plates provided with square or rectangular section channels, i.e. the setting of parameters for operating the cell is less delicate and provides a larger error or uncertainty margin.

According to the invention and preferably, both faces of said bipolar plate comprise at least one flute.

In a first embodiment of the bipolar plate, according to the invention, the angles of the transverse section of said channel are more open on the side of said channel formed by said electrode surface than on the side of said furthest channel away from said surface.

Preferably, in this first embodiment, the transverse section of said channel has substantially the shape of a convex quadrilateral comprising a first side formed by said electrode surface, a second side opposite to said first side, and two other sides, wherein the angles between said first side and each of said two other sides are more open than the angles between said opposite side and each of said two other sides.

In this geometry, the angles are more open at the level of the electrode than at the level of the areas where the liquid, such as water is to be lead to, as desired. The less open or acute angles which are therefore between the side opposite to the electrode—defining the "bottom" of the channel and of the flute—and each of both other sides, correspond to the most significant capillary effects and the liquid is preferably placed in these areas.

In this first embodiment, said convex quadrilateral is preferably a trapezium, the bases of which form said first side—the electrode surface—and said opposite side—the bottom of the channel and of the flute.

In other words, said first side and opposite side are then parallel to each other.

Still preferably, said trapezium is an isosceles trapezium, i.e. the sides other than the bases are equal.

In a second embodiment of the bipolar plate according to the invention, the transverse section of said channel is square or rectangular and, at least one of the walls or faces of the channel, other than that formed by the electrode surface, includes at least one groove or notch. The three walls or faces, other than that formed by the electrode surface, may include at least one groove or a notch.

Or else, only the two "side" walls of the channel, i.e. the walls other than the wall formed by the electrode surface and the wall of the channel opposite to the latter, include at least one groove or notch.

Or else, further, only the wall opposite to the wall formed by the electrode surface (bottom of the channel) includes at least one groove.

The shape of the grooves or notches may be of any shape, but generally these are grooves or notches with a V section with an aperture angle preferably less to 90°.

The size of the grooves is generally small as compared with the size of the channel, i.e. the depth and/or the width or the grooves only represents e.g. ¼ to ¹/₁₀, based on the size of the walls on which they are formed.

According to a particularly advantageous aspect of the present application, the specific geometry of the gas distribution channels of the bipolar plates, according to the invention, is able to facilitate integration of new functions into these plates.

These examples may, for example, comprise extraction and/or feeding means for redistributing the liquid, providing e.g. internal humidification of the gases. This function is facilitated by localizing the liquid, such as water, in areas, according to the invention, away from the surface of the electrode.

Said extraction and/or feeding means for redistributing the liquid comprise, for example, means for drainage and/or capillary upward flow comprising, for example, at least one porous component provided, for example, in or on the flute, used for distributing the gas in the area where the liquid is localized, i.e., an area away from the surface of the electrode, preferably, in or on the wall opposite to the wall formed by the electrode wall, and/or in or on at least one of the side walls of said flute.

The porous components may for example assume the shape of a plate inserted between the channels and used for redistributing water to the benefit of deficient areas, for example at the inlet of the cell, or for extracting the produced water from the cell.

The porous material may also assume the shape, for example of trapezium-shaped inserts.

The porous material may be a foam with open pores made of various materials, such as metal or even polymer materials.

The liquid extraction and/or feeding means may also comprise perforations or holes provided in at least one of the walls of the distribution flutes or channels, preferably in those portions of the walls of these flutes in contact with said porous component.

According to a particularly advantageous embodiment of the invention, the bipolar plate comprises a single stamped and bent plate comprising a succession of alternating flutes with the same depth on both sides of said unique plate.

Said flutes upon assembly of the stack of bipolar plates with electrodes (or rather EME assemblies: electrode/membrane/electrode assemblies) will thus define on both sides of said unique plate, two respectively anodic and cathodic gas distribution channels or areas.

The invention also relates to a method for manufacturing the bipolar plates described above. The method according to the invention which is simple, quick and of high accuracy, consists of the succession of the following steps:

providing one or more wires of an adequate shape in order to define the flutes of the bipolar plate;

fixing said wire(s) on at least one of the faces of a planar plate in order to define one or more flutes with the desired geometry.

Preferably, said wire is obtained by extrusion through a die of an adequate shape and the wire(s) are fixed to the plate by spot welding.

The invention finally relates to the fuel cell comprising at least one bipolar plate according to the invention.

BRIEF DESCRIPTION OF THE INVENTION

The invention will now be described in fuller details with reference to the appended drawings wherein.

DETAILED DESCRIPTION OF THE INVENTION

According to the invention, the transverse section of the gas distribution channel(s) has a shape or geometry such that the liquid of the biphasic flow flowing in said channel may be moved away from the surface of the electrode.

The inventors have characterized biphasic flows of a fuel cell and they have been able to show that several states of flow occurred during its operation, but surprisingly, only one of these states of flow led to higher performances of the cell.

Thus, three main states of flow could be demonstrated:

an annular flow, characterized by a thin liquid film covering all the walls of the channel, including the surface of the electrode;

an intermittent flow, characterized by intermittent passing of gas pockets and liquid water plugs and so by continuous presence of liquid over all of the walls of the channel, including the surface of the electrode;

a stratified or doubly stratified flow, including at least a water film on the upper an lower portions of the channel in its horizontal sections.

For example, when operating with hydrogen/oxygen, the intermittent and doubly stratified flow states exist on the anodic side and on the cathodic side in normal operating conditions.

When operating with hydrogen/air, the intermittent and doubly stratified flow states exist on the anodic side. Because of dilution of oxygen by nitrogen, intermittent flow is impossible on the air side and annular flow is observed in operating conditions characterized by very high flow rates.

It has therefore been shown then that in identical experimental conditions, except for the gas flow rate, and surprisingly, a doubly stratified flow provides higher performances of the cell then the two other annular and intermittent flow states.

Further, an intermittent flow induces voltage instabilities over time.

It is therefore obvious from the above that for maintaining the performances of a fuel cell with gas being distributed through channels, at their highest voltage level, it is necessary to preserve the doubly stratified flow state for the biphasic flows from the anodic and cathodic channels.

The explanation which is given here a posteriori, deals with the actual nature of the states of flow. In an annular flow state, the gas is surrounded with a liquid film over all its periphery. Also, in an intermittent flow, the gas pockets are also surrounded with a liquid water film. The electrode is not in direct contact with the reactive gas and the latter should diffuse through the liquid film, e.g. the water film, before reaching the electrode. This diffusion represents a limiting step. In the case of stratified flows, the gas has direct access to the electrode.

In realistic cases, the number of channels and the size of the channels do not have any foreseeable influence on the occurrence of an intermittent state. The gas flow rate is a key parameter for keeping a doubly stratified flow, but in order to reduce the bulkiness of the subsidiary components of the cell, such as the reformer, the humidifier, the tendency is to reduce the gas flow rate, which counteracts the influence of the gas flow rate on maintaining a doubly stratified state. The advantages of a doubly stratified flow should then be preserved for both gases, i.e., the absence of any liquid film on the electrode, without acting on the flow rate parameter.

This is precisely what has been achieved in the present invention, where it was surprisingly demonstrated that the shape of the channel was now the primordial parameter among the numerous parameters governing the cell's performances.

Any geometry which enables the liquid of the biphasic flow flowing in the channel to be moved away from the electrode surface complies with the invention, i.e., even though any channel geometry which enables the liquid to be preferably moved towards the areas away from the electrode in order to prevent the formation of a film against the electrode, still complies with the invention.

Such geometries are for example those which utilize the surface tension for meeting the requirement related to moving the liquid away from the electrode surface. Preferably, this geometry is defined by a specific geometry of the transverse section of the channel.

In a first embodiment of the bipolar plate of the invention, the angles of the transverse section of said channel are more open on the side of said channel formed by said electrode surface than on the side of said furthest channel (for example, the opposite side) away from said surface. Among the numerous geometries meeting this requirement, the transverse section of the distribution channel, preferably in this first embodiment, substantially assumes the shape of a convex quadrilateral comprising a first side consisting of the electrode surface, a second side opposite to said first side and two other sides, wherein angles between said first side and each of said two other sides are more open than the angles between said opposite side and each of said two other sides, i.e., the first mentioned angles are "obtuse" angles which range, for example from more than 90° to 135° and the second mentioned angles are "acute" angles which range, for example from less than 90° to 45°.

It is noted that such a geometry is different from the square and rectangular section geometries of the prior art channels and it enables the liquid to be moved away from the latter, specifically because of the large capillary effect of the opposite acute angles, far away from the electrode.

Figure 2:
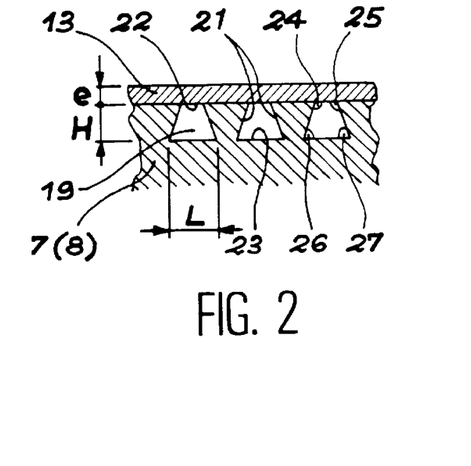
FIG. 2 illustrates a preferred embodiment from the first embodiment of the gas distribution channels for bipolar plates according to the invention.

FIG. 2 illustrates a preferred geometry for the channels according to the first embodiment of the invention: the channels (19) (see FIG. 1) have a transverse section in the shape of an isosceles trapezium the sides of which (21) other than the bases (22, 23) are equal and the small base of which (22) is defined by the surface of the electrode (13).

This geometry is also called a "dovetail geometry". This is a special case of a section assuming the shape of a convex quadrilateral with two parallel sides (22, 23) and two other equal sides (21). Of course, in all these geometries, the condition for the angles as defined earlier should be complied with.

Figure 4:
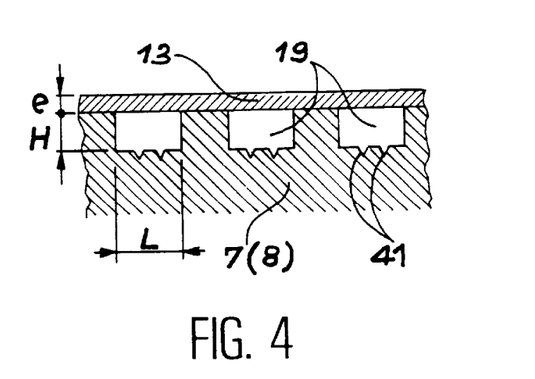
FIGS. 4 and 5 illustrate a second embodiment of gas distribution channels for bipolar plates according to the invention, wherein channels or flutes have rectangular and square sections, respectively, and are provided with notches or grooves.

The dimensions of the channels of FIG. 4 are for example a height or depth H of 1.5 mm and a length L of 1.5 mm for the bottom of the channel (23), i.e., the large base (23) of the trapezium, whereas the electrode (13) has a thickness e of 0.4 mm for example.

It is clearly obvious that these values are only given for informative purposes only and they may vary between large limits, for example H may range from 1 to 4 mm, L may range from 1 to 4 mm.

In FIG. 2, the angles near the electrode (24, 25) both have a value of 105°, i.e., they are much more open than the two opposite angles (26, 27) which have a value of 75°.

Once again, these values are only given for informative purposes only and the angles may assume all values defining obtuse and acute angles respectively.

Figure 3:
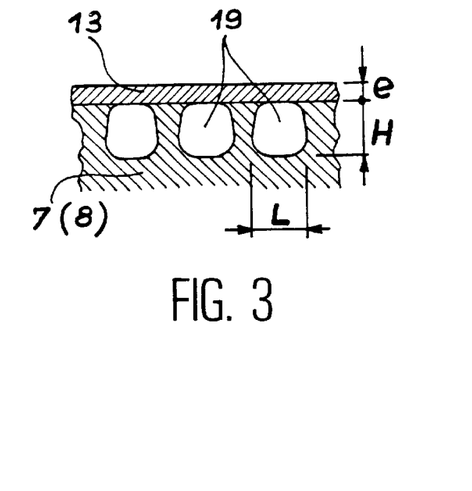
FIG. 3 illustrates an embodiment of gas distribution channels for bipolar plates according to the invention, in accordance with the first embodiment.

In FIG. 3, another preferred geometry for the channels according to the first embodiment of the channels of the invention is illustrated. In this case, the section of the channel (19) is substantially also that of an isosceles trapezium as in FIG. 3, but the angles of which would have been rounded. Dimensions H, L and e are identical to those mentioned earlier for the channels illustrated in FIG. 2.

Figure 5:
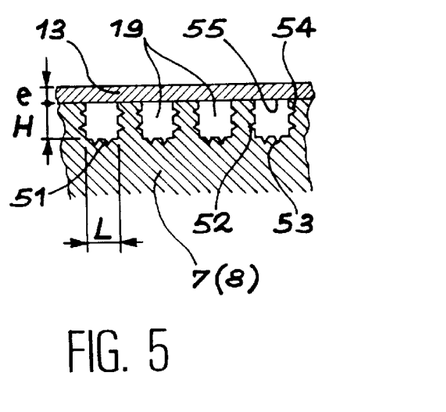

In FIGS. 4 and 5, two geometries for the distribution channels of the bipolar plates according to the second embodiment of the invention are illustrated. The section of the channel is rectangular (FIG. 4) or square (FIG. 5) and small notches or grooves are machined on the walls of the channel.

In FIG. 4, the channels have a rectangular section and notches or grooves (41), for example, two in number, are only provided on the walls of the channel opposite to the electrode.

In FIG. 5, the channels have a square section and two notches or grooves (51) are provided on the three walls of the channel (52, 53, 54) other than the electrode surface (55). The notches or grooves illustrated in FIGS. 4 and 5 are V-shaped with an angle of 60°. These notches are small, i.e., their depth is 0.5 mm.

The dimensions of the channels of FIGS. 4 and 5 are the following:
for the square section channels: side and depth H, L of 1.5 mm,
for the rectangular section channels: length L of 2.0 mm and depth H of 1.0 mm.

It is clearly obvious that these dimensions are given for informative purposes only and that the side of said squares may range from 1 to 4 mm, whereas the width H and length L of said rectangles may range from 1 to 4 mm and from 1 to 4 mm, respectively.

Also, it is clearly obvious that the number, the shape, of the grooves, their dimensions are only given as an example, other possible shapes are for example, trapezial or triangular shapes with a rounded bottom, and the depth of such grooves is generally a fraction of the width of the channel.

The bipolar plates according to the invention may be prepared by any known method. However, a preferred method for preparing the bipolar plates of the invention consists of making at least one suitably shaped wire for defining the distribution channels and flutes on a planar plate, and of fixing said wire on the plate in order to form the distribution channels.

Preferably the wire is obtained by extrusion through an ad hoc die of a suitable shape. Obviously a technology other than extrusion may be used in order to give the wire the specific shape according to the invention, for example, the wires may be prepared from ground surfaces by machining with two sizes of milling tool.

In any case the manufacturing method is able to give the wire the desired shape before even placing the wire on the plate.

Figure 6:
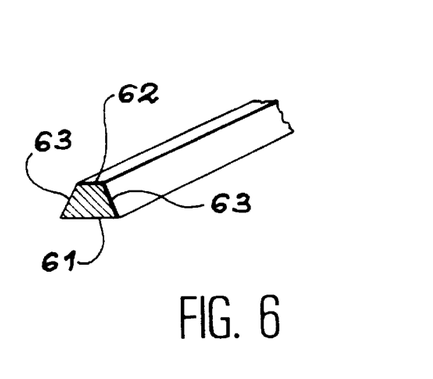
FIG. 6 illustrates a wire of a shape used in a method for preparing the bipolar plates according to the invention.

Thus, such a wire is illustrated in FIG. 6, which is suitable for preparing bipolar plates including flutes which then define the distribution channels, having a section in the shape of an isosceles trapezium. Therefore, the section of said wire has also the shape of an isosceles trapezium with parallel bases (61) and (62) and equal sides (63).

The wire is made of a material selected from materials which may usually be used for bipolar plates, for example stainless steel.

The wire(s) are then fixed onto at least one side, preferably on both sides of a planar plate in an appropriate material, itself also selected from materials compatible with the use of a fuel cell.

The wire is preferably fixed through spot welding on the planar plate. Such a simple and quick fixing method is sufficient for securing the wire on the plate, and a relative seal is provided during the compression corresponding to the mounting of several cells, each consisting of two bipolar plates separated by an electrode/membrane/electrode (EME) in order to make the fuel cell.

This preparation method is simple, quick, and of high accuracy as regards the shape and size of the distribution channels.

Figure 7:
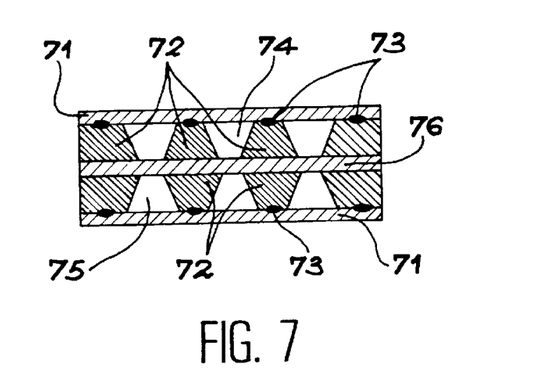
FIG. 7 illustrates an assembly forming an elementary cell comprising an electrode/membrane/electrode (EME) set and two bipolar plates prepared by a method according to the invention from the wire in FIG. 6.

The obtained assembly is illustrated in FIG. 7.

Wires of shape (72) (see FIG. 6) are fixed on two planar plates (71) by means of welding spots (73), and a EME set is placed between both thereby defined bipolar plates, including flutes forming distribution channels (74, 75). The distribution channels provide e.g. hydrogen distribution on the anode side (75) on the one hand, and on the other hand, oxygen on the cathode side (74).

Figure 8:
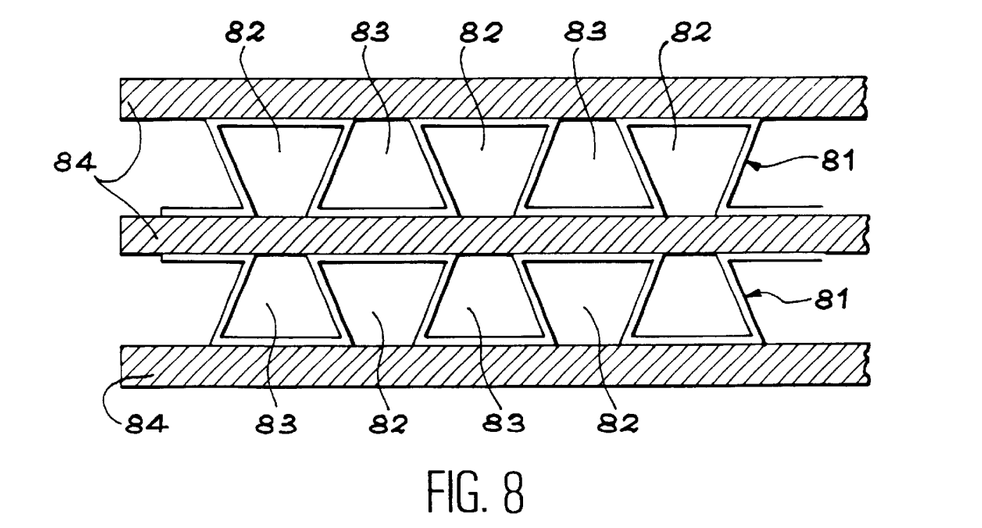
FIG. 8 illustrates an assembly comprising two electrode/membrane/electrode sets and two bipolar plates according to the invention consisting of stamped and bent metal sheet profiles.

Another method for manufacturing bipolar plates according to the invention, consists of forming a profile or unique metal sheet plate (for example, polymers or stainless steel) then stamping it and bending it in order to directly form the bipolar plate. Thus, the flutes corresponding to the cathode gas distribution channels (82) on the one hand and on the other hand to the anode gas distribution channels (83) are thereby formed simultaneously on both sides of the stamped and bent unique plate (81) and alternate on both sides of the latter. The assembly obtained with three electrode/membrane/electrode sets (84) thereby forming two elementary cells, is illustrated in FIG. 8.

Figure 9:
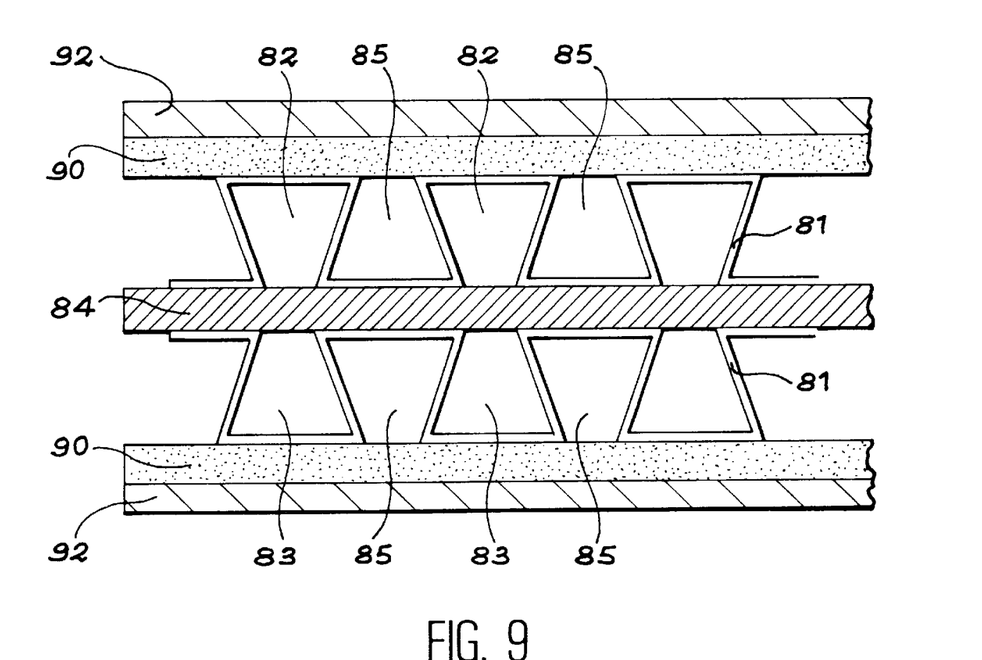
FIG. 9 illustrates an assembly comprising two electrode/membrane/electrode sets, two bipolar plates according to the invention, consisting of stamped and bent metal sheet profiles and porous materials for draining and redistributing liquid water, located at the bottom of the channel.

Or else, according to FIG. 9, said stamped and bent plates may be fixed onto a planar plate (92) providing the seal for forming the bipolar plate. In this way, on each side of an electrode/membrane/electrode set (84) channels (83) are alternately defined for distributing anode gas such as hydrogen and cathode gas (82) such as oxygen. The channels (85) may be used for thermal monitoring of the cell.

A porous plate (90) is placed in contact with the plate (92) and it supports the bent sheet metal flutes (82, 83) which are provided with holes (96) (see FIG. 9A) facing the porous material (90), i.e., on the "bottom" wall opposite to the electrode surface of the flutes (82, 83).

The porous components (90) placed at the bottom of the channels (82, 83) are able to provide capillary drainage of water and/or its distribution and its redistribution, for example for humidifying the gases.

Figure 9A:
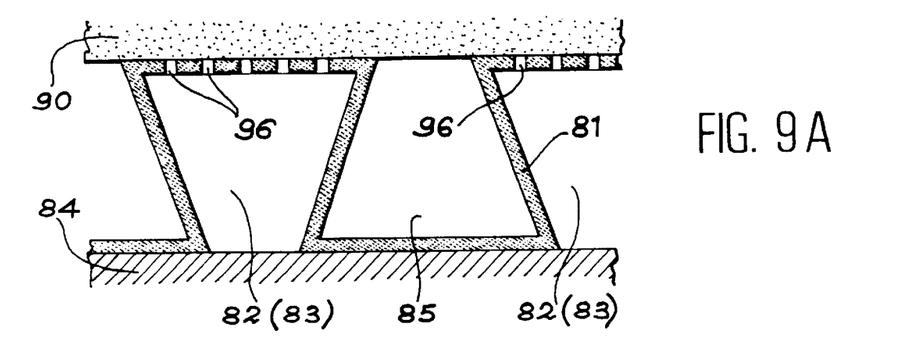
FIG. 9A shows an enlarged sectional view of a flute of the stamped and bent metal sheet bipolar plate of FIG. 9 provided with perforations on the bottom wall opposite to the electrode surface.

FIG. 9A illustrates an enlarged sectional view of a flute (82, 83) of the stamped and bent sheet metal bipolar plate (81) of FIG. 9, the bottom of said channel or said flute (82, 83) is provided with holes or perforations (96).

Figure 10:
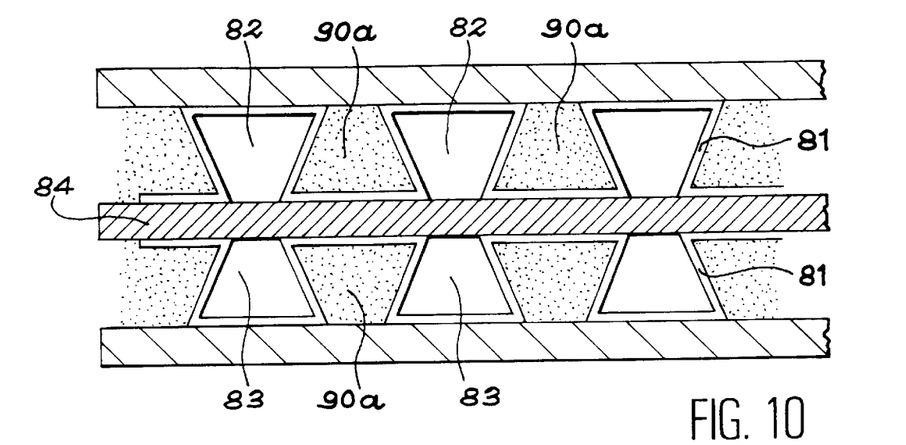
FIG. 10 illustrates an assembly comprising two electrode/membrane/electrode sets, two bipolar plates, according to the invention, consisting of stamped and bent metal sheet profiles and porous materials for draining and redistributing liquid water, located on the side faces of the distribution channels.

FIG. 10 illustrates an assembly substantially analogous to that of FIG. 9 comprising two electrode/membrane/electrode sets, two bipolar plates (81) according to the invention, consisting of stamped and bent sheet metal profiles and porous materials for draining and redistributing the liquid water, located on the side faces of the distribution channels (82, 83).

This means that in the assembly of FIG. 10, it is the channels (85), defined earlier in FIG. 9, which are filled with the porous components (90a), consequently it is the side walls of the flutes (82, 83) which are perforated and provided with holes (96) and not the bottom of said flutes as in FIG. 9.

In other words, in FIG. 10, the porous material (90a) is placed in the channels (85) which are no longer used for thermal monitoring as in FIG. 9 and the flutes are provided with side holes (96) facing the porous material.

Figure 10A:
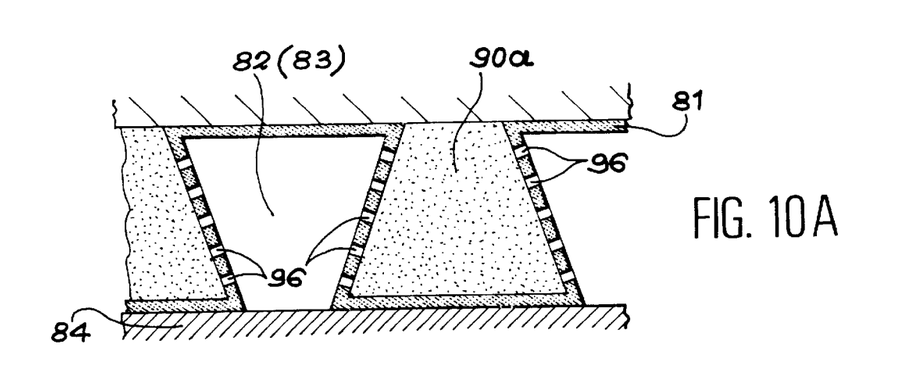
FIG. 10a is an enlarged sectional view of a flute of the stamped and bent metal sheet bipolar plate of FIG. 10 provided with perforations on its side walls.

FIG. 10A shows an enlarged sectional view of a flute (82, 83) of the stamped and bent sheet metal bipolar plate (81) of FIG. 10, the side walls of said channel are provided with holes or perforations (96).

The object of the present invention is also a fuel cell device comprising at least one bipolar plate according to the invention.

For instance, the fuel cell may correspond to the diagram already given in FIG. 1, i.e., the membrane (1) is placed between two electrodes (13) for example in a platinized carbon fabric (or treated with another noble metal), preferably impregnated with a compound such as Nafion®, or other, in order to obtain a bulk electrode.

This set is then positioned for example between two bipolar plates (7, 8) according to the invention which provides distribution of said anodic gas (4), hydrogen, on the anode side on the one hand, and on the other hand, distriburion of said cathodic gas such as oxygen (5) on the cathode side.

In addition to oxygen, the cathodic gas may be air or a gas mixture comprising oxygen.

The cell may also comprise means (not shown) for controlling temperature such as copper plates thermostatically controlled by heating pencils in single cells or heat exchangers in modules, and means for controlling the cell's operation and connected onto the external circuit (10): these means for example, comprise flow rate, temperature, pressure regulators and an electronic load in order to control current.

The cell according to the invention is not fundamentally different from the prior art cell according to FIG. 1, except for the shape of the gas distribution channels (19) which provide higher performances for the cell and the possibility of inserting porous areas for recovering water where it is localized through the shape of the channels of the present invention. Besides, particular shapes which the plates manufactured according to the invention may assume, as well as the assemblies and stacks of cells for a fuel cell containing them, have been described in the figures.

The fuel cells according to the invention are of particular interest for use in storing energy for powering electrical motors in electrical vehicles, or within the framework of energy producing modules for supplying backup power or for supplying power to areas with difficult access.

The invention will now be described with reference to the following illustrative and non-limiting examples.

EXAMPLE 1

In this example, the biphasic flows of a fuel cell on the anode side and on the cathode side operating with hydrogen/air and hydrogen/oxygen on a 250 $cm^2$ cell, including four channels on the cathode side and two channels on the anode side, with identical square sections of 1.5×1.5 $mm^2$, were characterized.

The flows were observed through a viewing port flush with the distribution channels and three main states of flow could thus be revealed and viewed: these are the three flow states defined earlier in the description, i.e.,: annular flow, intermittent flow and stratified or doubly stratified flow.

It is to be noted that in the characterization carried out in this example for doubly stratified flow, presence of water droplets against the wall of the viewing port means that annular flow is not involved because the water droplets cannot be held on a water film which wets the wall. The formation of an upper film in the doubly stratified flow is explained by the passing in the 180° bends.

EXAMPLE 2

In this example, the influence of the state of flow as defined in Example 1, on the performances of a fuel cell was studied.

The experimental conditions are the same throughout the whole experiment except for the gas flow rate ($O_2$) which enables the state of flow to be determined.

This experiment was conducted with hydrogen/oxygen at different gas flow rates on a 50 $cm^2$ cell placed in series with a 200 $cm^2$ cell at 4 bars and 80° C. The imposed current density values are 1.1 A/$cm^2$ for the 200 $cm^2$ cell and 2.0 A/$cm^2$ for the 50 $cm^2$ cell, respectively.

In order to maintain a doubly stratified flow on the anode side, the output hydrogen flow rate is maintained at 100 Nl/h. The results of this experiment have been plotted in FIG. 11, which is a graph representing as a function of time t expressed in hours, the oxygen flow rate $QO_2$ expressed in Nl/h (dotted line curve bellow), on the one hand and on the other hand the voltage U expressed in volts of the 50 $cm^2$ cell (solid line curve above). Furthermore, the flows were also viewed and observed through a port in the same way as in Example 1.

It is therefore seen that with an output oxygen flow rate of 50 Nl/h, the flow on the cathode side is doubly stratified and the cell's voltage is 0.42 V. The switching to a flow rate of 400 Nl/h, then to 800 Nl/h induces a drop in performances on the second cell due to the change in the state of flow; the state becomes an annular state, characterized by the occurrence of water wavelets which are easily discernible at the surface of the port. The initial performance level may be resumed by switching back to a flow rating of 50 Nl/h.

The oxygen flow rate was then reduced to 10 Nl/h in order to reach the intermittent flow state. The nature of this flow state was confirmed by viewing. The cell voltage is lower than in the case of stratified flow, around 0.40 V, and it exhibits the typical instabilities of an intermittent flow.

Figure 11:
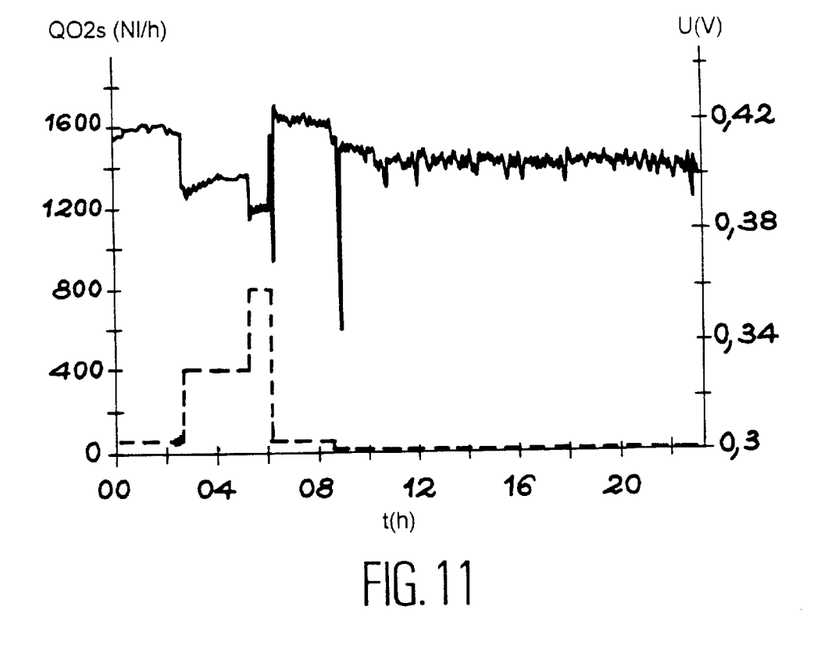
FIG. 11 is a graph which illustrates as a function of time t expressed in hours, the oxygen flow rate $QO_2$ expressed in Nl/h (curve in dotted lines) on the one hand and on the other hand, the voltage $U_{cel}$ expressed in volts (curve in solid lines) of a 50 cm² cell supplied with hydrogen/oxygen and placed in series with a 200 cm² cell.

FIG. 11 clearly shows that in identical experimental conditions, except for the gas flow rate, a doubly stratified flow provides higher cell performances than the two other main types of flow.

EXAMPLE 3

In this example, the time course of the voltage of a fuel cell was investigated over a long period by revealing the time instabilities due to an intermittent flow state.

As in Example 2, a 50 cm² cell supplied with hydrogen/oxygen was used but without its being in series with a 200 cm² cell.

Pressure is 4 bars, cell temperature is 80° C., humidification temperature is 90° C., and the gas input temperature is 20° C. Hydrogen and oxygen flow rates were maintained constant throughout the whole experiment and they were 10 Nl/h and 40 Nl/h respectively. The imposed current intensity was 100 A, i.e., 2 A/ cm².

Figure 12:
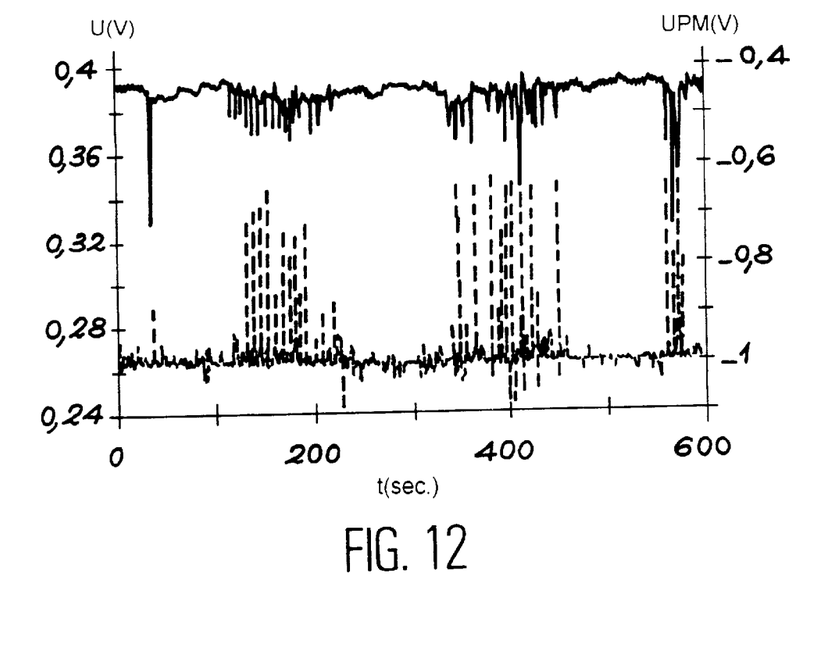
FIG. 12 is a graph which illustrates as a function of time t expressed in seconds the voltage $U_{cel}$ expressed in volts (curve in solid lines) of a 50 cm² cell on the one hand, and on the other hand the voltage expressed in volts (curve in dotted lines) of a photomultiplier detecting the passing of water plugs in the gas distribution channels of the cell.

A graph is shown in FIG. 12 which illustrates as a function of time expressed in seconds, the cell voltage in volts (solid line curve above) on the one hand and on the other hand the photo-multiplier voltage in volts (dotted line curve below).

By associating the photomultiplier with a laser placed in one of the gas distribution channels on the cathode side of the cell, it is possible to determine the contents of the channel: water or gas. Indeed, the reflection difference of a laser beam between a channel full of water and a channel full of gas was used for detecting the passing of liquid water plugs for intermittent flow. The reflected laser beam intensity is sent back to the photomultiplier.

It is seen on the curve of FIG. 12 which gives the photomultiplier voltage that each recorded peak at the photomultiplier, which corresponds to the passing of a liquid water plug is perfectly correlated with a very significant drop in performance at cell voltage level.

This example confirms that in order to obtain better performances and to maintain them over a long period without any random variations, only the specific flow according to the invention is suitable and also consequently the specific geometry according to the invention.

What is claimed is:

1. A bipolar plate for a fuel cell comprising on at least one of its faces, at least one flute able to form with the surface of an adjacent electrode at least one gas distribution channel, wherein the transverse section of said distribution channel substantially has the shape of a convex quadrilateral comprising a first side formed by electrode surface, a second side opposite to said first side, and two other sides, the angles between said first side and each of said two other sides being more open than the angles between said opposite side and each of said two other sides.

2. The bipolar plate according to claim 1, wherein both faces of the bipolar plate comprise at least one flute.

3. The bipolar plate according to claim 1, wherein said convex quadrilateral is a trapezium, the bases of which form said first side and said opposite side.

4. The bipolar plate according to claim 3, wherein said trapezium is an isosceles trapezium.

5. The bipolar plate according to claim 1, wherein said plates comprise liquid extraction and/or feeding means.

6. The bipolar plate according to claim 5, wherein said liquid extraction and/or feeding means comprise at least one porous component.

7. The bipolar plate according to claim 6, wherein said porous component is provided in the gas distribution channel or flute in the area away from the electrode surface where the liquid is localized.

8. The bipolar plate according to claim 6, wherein said liquid extraction and/or feeding means comprise perforations or holes provided in at least one of the walls of said channel different from the wall formed by the electrode surface and wherein said perforations are provided in the portions of the walls of the flutes in contact with said porous component.

9. The bipolar plate according to claim 5, wherein said liquid extraction and/or feeding means comprise perforations or holes provided in at least one of the walls of said channel different from the wall formed by the electrode surface.

10. The bipolar plate according to claim 1, consisting of a unique stamped and bent plate comprising a succession of flutes with the same depth, alternating on both sides of said unique plate.

11. A method for preparing the bipolar plate according to claim 1 consisting of the sequence of the following steps:
provide one or more wire(s) having the suitable shape for defining the flutes of the bipolar plate;
fix said wire(s) on at least one of the faces of a planar plate in order to define flute(s) with the desired geometry.

12. The method according to claim 11 wherein said wire(s) are fixed by spot welding.

13. A fuel cell comprising at least one bipolar plate according to claim 1.

14. A bipolar plate for a fuel cell comprising on at least one of its faces at least one flute able to form with the surface of an adjacent channel at least one gas distribution channel, wherein the transverse section of said channel is square or rectangular, and at least one of the walls or faces of the channel other than that formed by the electrode surface includes at least one groove or notch.

15. The bipolar plate according to claim 14, wherein both faces of the bipolar plate comprise at least one flute.

16. The bipolar plate according to claim 14, wherein the three walls or faces of the channel, other than that formed by the electrode surface, includes at least one groove or notch.

17. The bipolar plate according to claim 14, wherein only the wall of the channel opposite to the wall formed by the electrode surface includes at least one groove or notch.

18. The bipolar plate according to claim 14, wherein only the walls of the channel, other than that formed by the electrode surface and the wall of the channel opposite to the latter, include at least one groove or notch.

19. The bipolar plate according to claim 14, wherein said notch(es) or groove(s) have a V section.

20. The bipolar plate according to claim 19, wherein said V section has an aperture angle less than 90°.

21. The bipolar plate according to claim 14, wherein said plates comprise liquid extraction and/or feeding means.

22. The bipolar plate according to claim 21, wherein said liquid extraction and/or feeding means comprise at least one porous component.

23. The bipolar plate according to claim 22, wherein said porous component is provided in the gas distribution channel or flute in the area away from the electrode surface where the liquid is localized.

24. The bipolar plate according to claim 22, wherein said liquid extraction and/or feeding means comprise perforations or holes provided in at least one of the walls of said channel different from the wall formed by the electrode surface and wherein said perforations are provided in the portions of the walls of the flutes in contact with said porous component.

25. The bipolar plate according to claim 21, wherein said liquid extraction and/or feeding means comprise perforations or holes provided in at least one of the walls of said channel different from the wall formed by the electrode surface.

26. The bipolar plate according to claim 14, consisting of a unique stamped and bent plate comprising a succession of flutes with the same depth, alternating on both sides of said unique plate.

27. A method for preparing the bipolar plate according to claim 14 consisting of the sequence of the following steps:

provide one or more wire(s) having the suitable shape for defining the flutes of the bipolar plate;

fix said wire(s) on at least one of the faces of a planar plate in order to define flute(s) with the desired geometry.

28. The method according to claim 27 wherein said wire(s) are fixed by spot welding.

29. A fuel cell comprising at least one bipolar plate according to claim 14.

* * * * *

UNITED STATES PATENT AND TRADEMARK OFFICE
CERTIFICATE OF CORRECTION

PATENT NO. : 6,649,297 B1
DATED : November 18, 2003
INVENTOR(S) : Marielle Marchand et al.

It is certified that error appears in the above-identified patent and that said Letters Patent is hereby corrected as shown below:

Title page,
Item [73], Assignees, please delete "Automobiles Citrogen", and insert therefor
-- Automobiles Citroen --.

Column 1,
Line 41, please delete "$O_2 + 4H^+ + 4e^-43\ 2H_2O$,", and insert therefor
-- $O_2 + 4H^+ + 4e^- \rightarrow 2H_2O$, --.

Column 2,
Line 29, please delete "fuel,", and insert therefor -- fuel --.

Signed and Sealed this

Sixth Day of April, 2004

JON W. DUDAS
*Acting Director of the United States Patent and Trademark Office*